Oct. 9, 1928.

O. SAMMINIATELLI 1,687,391

DISPLAY APPARATUS

Filed Dec. 6, 1926

Oreste Samminiatelli
INVENTOR

BY Victor J. Evans
ATTORNEY

WITNESS:

Oct. 9, 1928.

O. SAMMINIATELLI 1,687,391

DISPLAY APPARATUS

Filed Dec. 6, 1926   3 Sheets-Sheet 2

Oreste Samminiatelli INVENTOR

BY Victor J. Evans ATTORNEY

WITNESS: R. A. Thomas

Oct. 9, 1928.
O. SAMMINIATELLI
DISPLAY APPARATUS
Filed Dec. 6, 1926    3 Sheets-Sheet 3
1,687,391
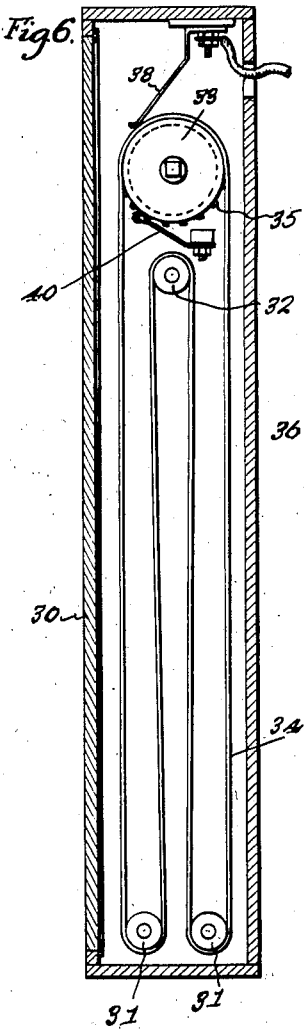
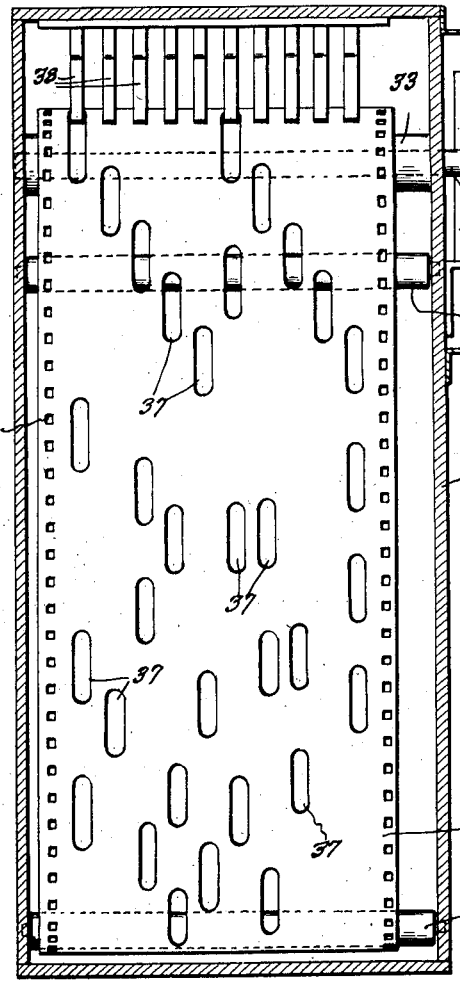
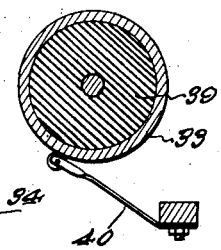
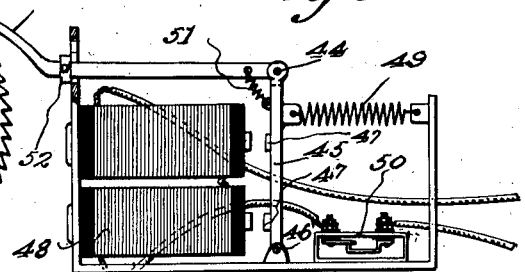
Oreste Samminiatelli, INVENTOR Patented Oct. 9, 1928.

1,687,391

UNITED STATES PATENT OFFICE.

ORESTE SAMMINIATELLI, OF EAST TOLEDO, OHIO.

DISPLAY APPARATUS.

Application filed December 6, 1926. Serial No. 152,950.

This invention relates to electric novelties for use as toys or display devices, an object being to provide an electric device which will be pleasing and attractive to the eye, as well as to afford amusement.

Another object of the invention is to provide a plurality of lamps arranged in groups and mounted for rotation, novel means being provided for mounting the lamps, as well as for controlling the flow of current therethrough.

With the above and other objects in view, the invention further includes the following novel features and details of construction, to be hereinafter more fully described, illustrated in the accompanying drawings and pointed out in the appended claim.

In the drawings:—

Figure 6 is a sectional view illustrating means for automatically controlling the circuits through the lamps.

Figure 7 is a section taken at right angles to Figure 6.

Figure 8 is an enlarged fragmentary section taken transversely of the conductor roller.

Figure 9 is a detail view of the automatic actuating mechanism.

Figure 1:
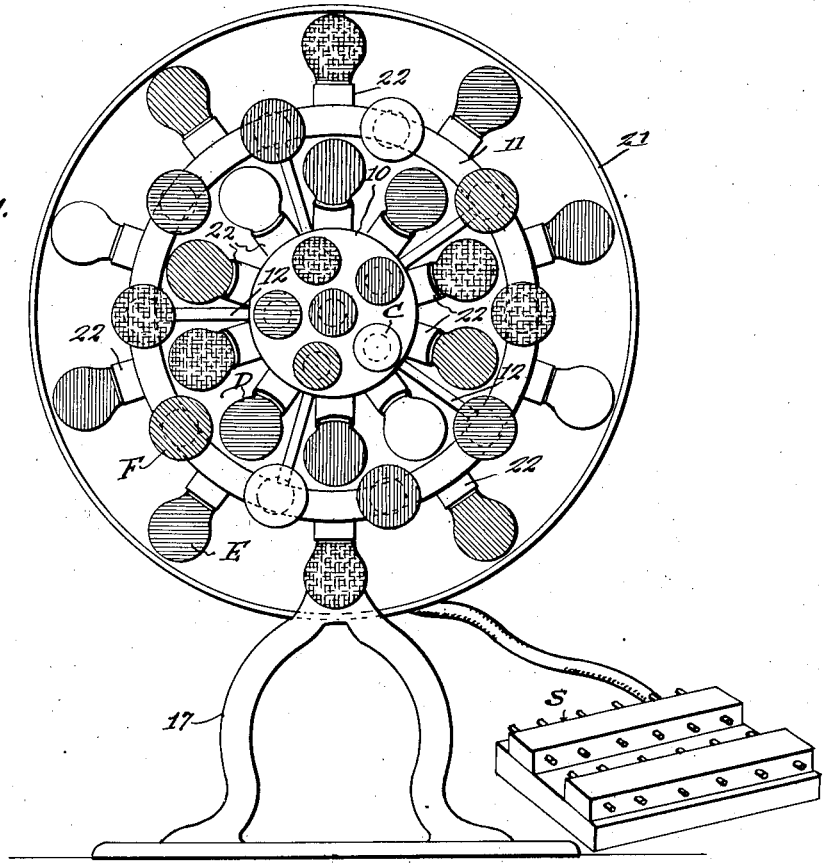
Figure 1 is an elevation of the device, the circuit controlling means being shown in perspective.
Figure 3:
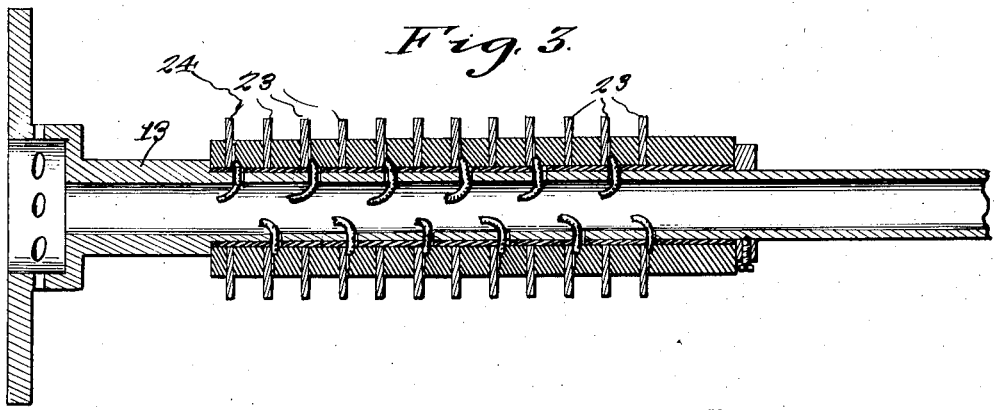
Figure 3 is an enlarged section taken longitudinally of the hollow shaft.
Figure 2:
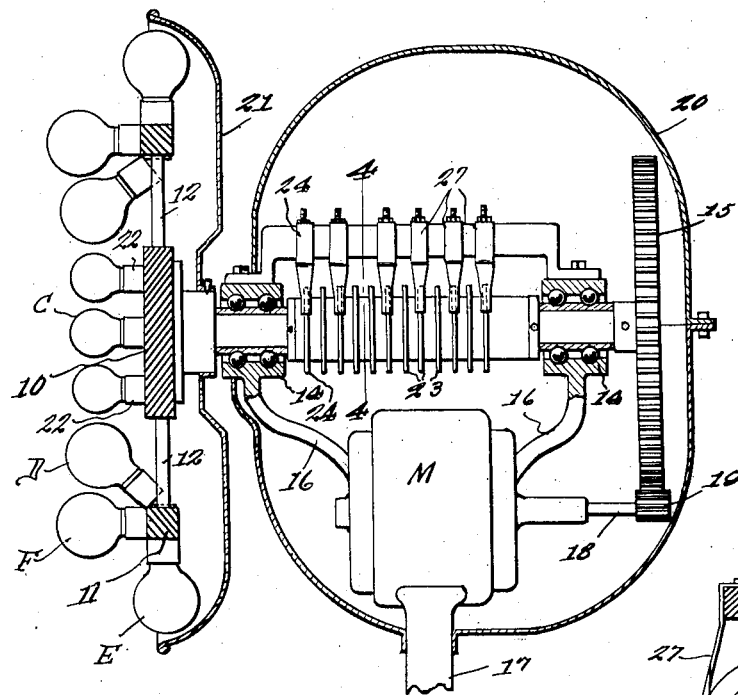
Figure 2 is an enlarged fragmentary sectional view.
Figure 4:
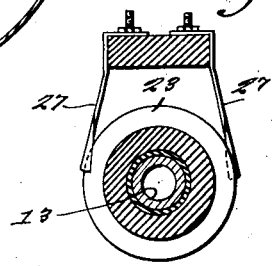
Figure 4 is an enlarged transverse section taken substantially on the line 4—4 of Figure 2.

Referring to the drawings in detail and more especially to Figures 1 to 5 inclusive, the device is shown as comprising a frame which includes a hub 10 and a rim 11, connected by spokes 12. This hub is mounted upon a hollow shaft 13 and the latter is mounted in suitable bearings 14, while also mounted on the shaft 13 is a gear 15. The bearings 14 are supported at the outer ends of arms 16 which are carried by the housing of a motor M. This motor is supported by a suitable standard 17 which may be of any suitable size or configuration. The motor shaft 18 has mounted thereon a pinion 19 which drives the gear 15. A sectional housing 20 encloses the motor, the shaft 13 and the gear and pinion 15 and 19 respectively.

Secured upon the shaft 13 is a backing plate 21 which may be in the form of a reflector.

The frame carries a plurality of lamp sockets 22 arranged to provide a center group C, an inner group D, an outer group E and an intermediate group F. These groups of sockets are adapted to receive lamps of different colors and each group may be of a single color, or the groups may be divided into a plurality of differently colored groups. For example, the outer group E may have two red lights as indicated at R, two white lights as indicated at W, two green lights as indicated at G and two yellow lights as indicated at Y in Figure 5 of the drawings. The intermediate group may be similarly divided as may also be the inner group, while the center group may be likewise divided, or all of the lamps of the center group may be of the same color.

Each group of lamps is adapted to be independently illuminated, or any number of groups may be simultaneously illuminated and in the form of the invention illustrated in Figures 1 to 5, flow of current to the lamps is manually controlled. For this purpose, the shaft 13 is provided with spaced collector rings 23, there being one of these rings for each group, while a ring 24 is provided for contact by a brush 25 and the latter is connected to a source of current, such as a battery 26.

Each of the other rings is engaged by a brush 27 and the brushes and rings are included in the various lamp circuits. For example, it will be seen by reference to Figure 5 that the ring R' is electrically connected with the red lamps R of the inner and outer groups D and E, while the ring W' is electrically connected to the white lamps W of the same groups. The ring G' is electrically connected to the green lamps G of the inner and outer groups D and E and the ring Y' is electrically connected to the yellow lamps of these same groups. The ring B' is electrically connected to the blue lamps B of the inner and outer groups. Current to each of the rings just described is controlled by a switch S which may be of any preferred type, it is preferred however, to employ the ordinary type of push switches.

Figure 5:
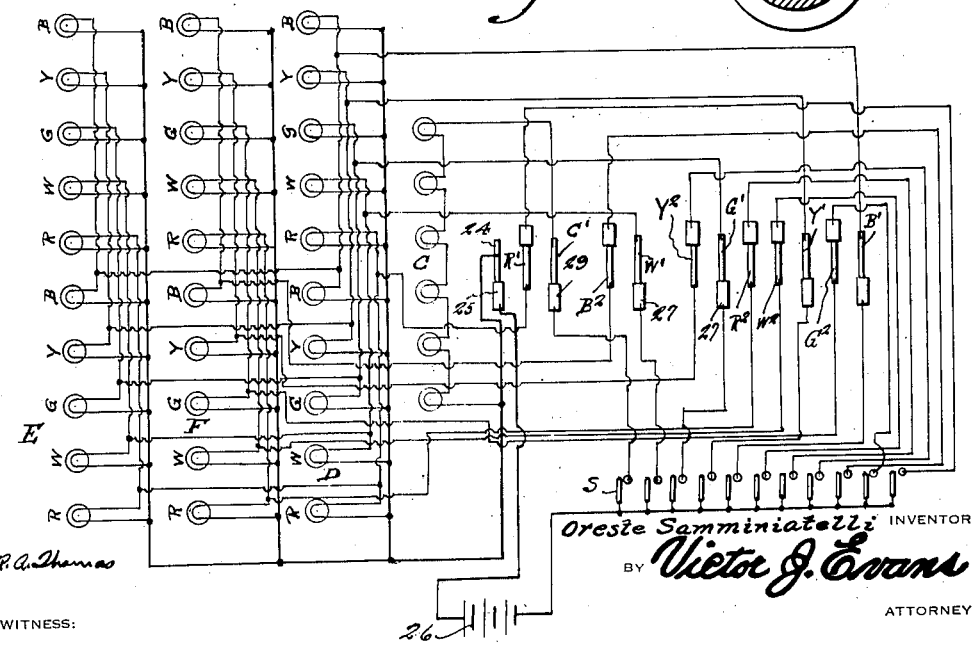
Figure 5 is a diagram of the wiring.

The lamps of the intermediate group F are divided into differently colored groups as indicated by the letters R, W, G, Y and B in Figure 5 of the drawings, there being two of each color in this intermediate group. The lamps of the same color are connected, as described in connection with the preceding group, the red lamps R being electrically connected to a ring R². The white lamps W are electrically connected to a ring W², the yellow lamps Y to a ring Y² and the blue lamps B to a ring B². Each of these rings is in contact with a brush 28 which is connected to one of the switches S so as to control the flow of current to the lamps. The lamps of the center group C are all connected electrically to a single ring C' which is engaged by a brush 29 and the latter is also connected to one of the switches S. It will be apparent that by operating any of the switches, current to any group of lamps may be controlled. A separate circuit may be provided for controlling the motor M and when the motor is operated, the lamps will be rotated and an amusing and pleasing effect will be obtained through manipulating the switches S.

If desired, an automatic switch or control may be substituted for the switches S, one form of which is illustrated in Figures 6 to 9 of the drawings. This switch is arranged within a housing 30 in which are mounted rollers 31, 32 and 33. Traveling over these rollers is an endless belt 34 made of any suitable material, the rollers 31 and 32 being provided so as to accommodate a belt of relatively great length within a small housing. The roller 33 is provided with teeth 35 which engage openings 36 provided along opposite edges of the belt so that the latter will be accurately moved. The belt is further provided with openings 37, the purpose of which will be presently apparent.

Mounted within the casing is a plurality of spaced contact fingers or brushes 38, which are electrically connected to the brushes 25, 27 and 29 previously mentioned, so as to be included in the various lamp circuits. The roller 33 is preferably formed of a metallic cylinder mounted upon an insulated core 39, as shown in Figure 8 of the drawings so as to provide a current distributing roller. Current is supplied to the roller 33 by means of a brush 40 which is mounted within the housing and connected to a suitable source of current. The roller 33 and the brush 40 are the equivalent of the ring 24 and brush 25 shown in Figure 5 of the drawings.

The shaft 41 upon which the roller 33 is mounted has secured thereon a ratchet wheel 42. This wheel is engaged by a dog 43 having one end pivotally secured as at 44 to a rocker arm 45, as shown in Figure 9 of the drawings. The arm 45 is pivotally mounted as shown at 46 and carries armatures 47 which are arranged in the field of magnets 48, so that when the latter are energized, the rocker arm 45 will be moved pivotally in a direction to cause the dog 43 to impart a limited rotary movement to the ratchet wheel 42. The roller 33 and the belt 34 will likewise be given a limited movement. When the magnets 48 are de-energized, the rocker arm 45 is moved in an opposite direction under the influence of a spring 49. Included in the magnet circuit is a thermostatic electric switch 50 which acts to close when sufficiently heated so as to complete a circuit through the magnets and operate the dog as stated. A step by step motion will thus be imparted to the belt 34 and as the openings 37 in the belt are arranged in a line with the brushes 38, the latter will contact with the current distributing roller 33 at intervals and complete a circuit through certain of the lamps during the period of contact. The dog 43 is yieldingly forced downward to engage the teeth of the ratchet wheel 42 by means of a spring 51. A collar 52 is adjustable upon the dog so as to regulate the distance the ratchet wheel is moved at each operation. For example, assuming that the position of the collar 50 is such that at each operation the wheel 42 will be moved a distance of one tooth, by moving the dog outward so as to permit of a greater longitudinal movement of the dog, the wheel may be moved a distance of two or more teeth.

The device may be made in various sizes and may contain any number of lamps. The frame upon which the lamps are mounted, and the reflector behind the lamps may be of any desired configuration. If desired, the member 21 instead of being a reflector may have a dull finish so as to reduce glare when the device is used within a building or room.

The device may be used as a window display, or it may be placed upon the outside of a building and constructed so as to project the light of the lamps for a considerable distance, after the manner of a searchlight.

If desired, the belt 34 may be driven by some means other than the dog and ratchet mechanism illustrated. For example, an electric motor, or other source of power may be suitably geared to the shaft 41 to provide either a continuous or intermittent movement of the shaft.

The invention is susceptible of various changes in its form, proportions and minor details of construction and the right is herein reserved to make such changes as properly fall within the scope of the appended claim.

Having described the invention what is claimed is:—

In an electrically operated display device, a standard, an electric motor mounted thereon, a housing enclosing the motor, bearing arms extending from the motor and located within the housing, a shaft mounted in the bearing arms and extending through the housing, a display device mounted upon the outer end of the shaft, means located within the housing and operatively connecting the shaft of the motor and the bearing arm shaft to operate the latter and rotate the display device, electric elements included in the display device, collector rings carried by the bearing arm shaft and electrically connected with the electric elements, a supporting arm carried by the bearing arms, and brushes secured to the supporting arm and engaging the collector rings for connection with a source of current.

In testimony whereof I affix my signature.

ORESTE SAMMINIATELLI.